United States Patent
Kielhofner et al.

(10) Patent No.: US 10,212,198 B1
(45) Date of Patent: Feb. 19, 2019

(54) COMMUNICATION NODE, SYSTEM, AND METHOD FOR OPTIMIZED DYNAMIC CODEC SELECTION

(71) Applicant: Star2Star Communications, LLC, Sarasota, FL (US)

(72) Inventors: Kristian Kielhofner, Lake Geneva, WI (US); Norman A. Worthington, III, Sarasota, FL (US)

(73) Assignee: STAR2STAR COMMUNICATIONS, LLC DE (US)

( * ) Notice: Subject to any disclaimer, the term of this patent is extended or adjusted under 35 U.S.C. 154(b) by 0 days.

(21) Appl. No.: 15/667,289

(22) Filed: Aug. 2, 2017

(51) Int. Cl.
H04L 29/06 (2006.01)
H04L 29/08 (2006.01)

(52) U.S. Cl.
CPC ........ *H04L 65/1069* (2013.01); *H04L 65/608* (2013.01); *H04L 65/80* (2013.01); *H04L 69/326* (2013.01)

(58) Field of Classification Search
CPC . H04L 65/1069; H04L 69/326; H04L 65/608; H04L 65/80
See application file for complete search history.

(56) References Cited

U.S. PATENT DOCUMENTS

| | | |
|---|---|---|
| 6,754,232 B1 | 6/2004 | Tasker |
| 6,888,885 B2 | 5/2005 | Yu |
| 7,023,839 B1 | 4/2006 | Shaffer et al. |
| 7,567,897 B2 | 7/2009 | Halcrow et al. |
| 7,733,850 B1 | 6/2010 | Croak et al. |
| 7,768,998 B1 | 8/2010 | Everson et al. |
| 8,996,043 B1 | 3/2015 | Oroskar |

(Continued)

*Primary Examiner* — Lakeram Jangbahadur
(74) *Attorney, Agent, or Firm* — Katharyn E. Owen

(57) ABSTRACT

The present invention is directed towards a communication node, a system, and a method for dynamically switching a first codec to a second codec for a communication session. The communication node, to implement the method, can be operably connected to communication endpoints, a codec database, at least one second communication node, and a destination node. The communication node monitors the network within which the communication session originates to detect if a network event has occurred, and if detected, obtain the catalog of available and supported codecs. The communication node then selects a second codec from the catalog of available and supported codecs to replace the first codec, based at least in part on a prioritization of the catalog of available and supported codecs, the network event, a session type, a session criteria, and predetermined routing information for the communication session. Thereafter, the first communication node generates a network message, which directs at least one second communication node to switch from the first codec to the second codec, and transmits the communication session with the network message thereto. The at least one second communication node, upon receiving, replaces the first codec with the second codec by a modification of at least one signaling protocol. If the destination node is unable to accept the communication session using the second codec, the at least one second communication node can generate a network message to direct an at least one third communication node to replace the second codec with the first codec before delivery.

37 Claims, 4 Drawing Sheets

(56) References Cited

U.S. PATENT DOCUMENTS

| | | |
|---|---|---|
| 9,083,378 B2 | 7/2015 | Jin et al. |
| 9,208,798 B2 | 12/2015 | Ward et al. |
| 9,264,288 B1 | 2/2016 | Arora et al. |
| 9,832,250 B1 | 11/2017 | Arora et al. |
| 9,876,838 B2 | 1/2018 | Li et al. |
| 2008/0002670 A1* | 1/2008 | Bugenhagen ........... H04L 12/66 370/352 |
| 2018/0097854 A1* | 4/2018 | Patel .................. H04L 65/1083 |
| 2018/0262540 A1* | 9/2018 | Karimli .................. H04L 43/08 |

* cited by examiner

COMMUNICATION NODE, SYSTEM, AND METHOD FOR OPTIMIZED DYNAMIC CODEC SELECTION

FIELD OF THE INVENTION

The present methods and systems relate generally to electronic communication systems, particularly to managing communication sessions end-to-end, from an originating source to a terminating destination, where the communication sessions involve delivery of application data (e.g., audio (voice) data, audio/video data, electronic file downloads, etc.) over one or more third party networks which have at least one available communication codec, as well as include public and private networks.

BACKGROUND OF THE INVENTION

A codec is generally a piece of compression and transmission software that may be used to compress or convert one signal, generally an analog voice signal, such as a phone call, into a second digital signal that is ready for transmission via a communication network, in one example, the public Internet. Once this digital signal has been transmitted from a first communication node and has been received at a second communication, a codec at the receiving or second communication node may convert the digital signal back into an analog voice signal. Codecs, however, can often vary significantly following compression and transmission which can substantially affect voice transmission quality.

A number of codecs exist, which provides the organizations using them the flexibility to choose a codec that optimizes that organizations' available bandwidth and computational power. For the various codecs to optimally function, the receiving or second communication node must have access to the same codec with which the sending or first communication node compressed and transmitted the data signal. A codec mismatch would result in the data signal transmission not being received at the second communication node.

In the event of a network disruption, or a "network event," the probability of a codec mismatch increases, as the pathways through which a communication session may be routed can be altered, for example, to navigate around the network event, and in some cases may result in the communication session being delivered to a "different" destination node or second communication node.

Therefore, a reliable system and method are needed for a sending or first communication node to select an optimal codec, which may be transmitted to a receiving or second communication node which either accepts that optimal codec or which codec can be dynamically switched prior to reception at the receiving or second communication node. So if necessary, a codec may by dynamically selected for a certain data signal to optimize the transmission of that data signal from the sending or first communication node, especially in the event of a network disruption or network event which alters the predetermined routing path of a communication session (i.e., a communication session needs to be routed via different pathways to circumvent a service disruption or system failure).

SUMMARY OF THE INVENTION

It is, therefore, an object of the present invention to provide a communication node, a system, and a method for dynamically switching a codec for a communication session from a first codec to a second codec.

The present invention may optionally operate within a number of communications and/or network environments, for example, but in no way limited to, the public Internet, a private Internet or Intranet, a network on one side of a third-party provided address family translation or network address translation (NAT) implementation, a network on a second side of a third-party provided NAT implementation, a data transport network or a series of networks, a communications network or series of networks, a non-optimized communications network or series of networks, an optimized communications network or series of networks, and the like.

In one exemplary embodiment, a communication node is provided. The communication node can comprise a communication module, a network monitor, a determiner, and a network message generator, all of which components can operate independently, simultaneously, in conjunction with one another in any combination, consecutively, sequentially, or in any functionally necessary combination to dynamically select a codec for a communication session transmitted within at least one network.

In one exemplary aspect, the communication module can accept an at least one session parameter initiating the communication session. For purposes of this written specification, by way of example only, this at least one session parameter can comprise the following identifying information related to the communication session: a session criteria, a session type, predetermined routing information for routing the communication session, and a first codec. The communication module can also transmit the communication session to a second communication node. A second communication node in this context may be an originating, intermediary, and/or destination communication node.

In another exemplary aspect, the network monitor can observe the network and can detect if a network event occurs. If a network event is detected, the network monitor can also direct a codec database operably connected to the communication node to transfer a catalog of available and supported codecs to the communication node.

In another exemplary aspect, the determiner can select a second codec from the catalog of available and supported codecs. The determiner can select the second codec based at least in part on a prioritization of the catalog of available and supported codecs, the network event, the session type, the session criteria, and the predetermined routing information for routing the communication session.

In yet still another exemplary aspect, the message generator can create a network message directing a second communication node to replace the first codec with the second codec. Replacement, for purposes of this written specification and the claims, can comprise a modification of at least one signaling protocol of the communication session to remove the first codec, integrate the second codec, and indicate the second codec for reception at a destination node.

The following are either or both additional and exemplary aspects of the present exemplary embodiment, one or more of which can be combined with the basic inventive communication node embodied above:

monitoring the network to detect a network event can include receiving and analyzing at least one in-band message and at least one out-of-band message associated with the communication session;

an at least one in-band message can be at least one Real-time Transport Protocol (RTP) message;

an at least one out-of-band message can be at least one RTP Control Protocol (RTCP) message;

the first codec and the second codec can be at least one of a set of codecs which have audio compression formats, text compression formats, and video compression formats;

the destination node can be within at least one of the network and a second network;

a codec modifier for modification of at least one signaling protocol of the communication session to remove the first codec, integrate the second codec, and indicate the second codec for reception at the destination node, wherein modification of the at least one signaling protocol can occur at the communication node, with no network message needing to be created to notify a second communication node to modify the at least one signaling protocol;

modification of at least one signaling protocol can further comprise a modification at a transport layer;

the catalog of available and supported codecs can be prioritized at least in part based on a throughput threshold;

the catalog of available and supported codecs can be further prioritized at least in part based on a latency threshold;

the catalog of available and supported codecs can be prioritized at least in part based on the throughput threshold or a latency threshold;

the throughput threshold can further comprise a set of throughput thresholds based at least in part on a range of session types, a range of session criteria, and at least one network condition, wherein the codec database determines the throughput threshold from the set of throughput thresholds based on the communication session at least one session parameter session communicated to the codec database by the communication node; and the latency threshold can further comprise a set of latency thresholds based at least in part on a range of session types, a range of session criteria, and at least one network condition, wherein the codec database determines the latency threshold from the set of latency thresholds based on the communication session at least one session parameter session communicated to the codec database by the communication node.

In another exemplary embodiment, a system is provided. The system comprises at least one communication endpoint, a codec database, a first communication node, and at least one second communication node, all of which system and/or network elements can operate independently, simultaneously, in conjunction with one another in any combination, consecutively, sequentially, or in functionally necessary combination to dynamically select a codec for a communication session transmitted within at least one network.

In one exemplary aspect, the codec database can comprise a catalog of available and supported codecs. This catalog of available and supported codecs can be prioritized by the codec database, at least in part, based on a throughput threshold.

In another exemplary aspect, the first communication node can be operably connected to the at least one communication endpoint as well as to the codec database.

In yet another exemplary aspect, the first communication node can, at a minimum, comprise each of the exemplary aspects as described above .

In yet still another exemplary aspect, the at least one second communication node can be operably connected to the first communication node.

In a further exemplary aspect, the at least one second communication node can comprise a codec modifier which can replace the first codec with the second codec based on the network message provided by the first communication node. For purposes of this written specification, replacement can include a modification of at least one communication session signaling protocol to withdraw the first codec without altering the communication session, integrate the second codec, and indicate the second codec for reception at a destination node.

In yet still a further exemplary aspect, the at least one second communication node can comprise a second communication module which can receive the communication session and the associated network message from the first communication node and transmit the communication session to the destination node.

The following are either or both additional and exemplary aspects of the present exemplary system, one or more of which can be combined with the basic inventive system as embodied above:

the second communication node can include a second message generator for creating a second network message to notify at least one third communication node to switch the second codec to the first codec if the destination node only accepts communication sessions compressed using the first codec;

the system can further comprise at least one third communication node, which when it receives the communication session with the modified at least one signaling protocol where the first codec has been replaced with the second codec, can comprise:

an at least one third codec modifier to replace the second codec with the first codec based on a network message created and transmitted by the at least one second communication node, whereby replacement comprises a modification of at least one communication session signaling protocol to withdraw the second codec without altering the communication session, integrate the first codec, and indicate the first codec for reception at a destination node.

the catalog of available and supported codecs can be prioritized at least in part based on a latency threshold;

the catalog of available and supported codecs can be prioritized at least in part based on the throughput threshold or a latency threshold;

the throughput threshold can include a set of throughput thresholds based at least in part on a range of session types, a range of session criteria, and at least one network condition, wherein the codec database determines the throughput threshold from the set of throughput thresholds based on the communication session at least one session parameter session communicated to the codec database by the first communication node;

the latency threshold can include a set of latency thresholds based at least in part on a range of session types, a range of session criteria, and at least one network condition, wherein the codec database determines the latency threshold from the set of latency thresholds based on the communication session at least one session parameter session communicated to the codec database by the first communication node;

monitoring the network to detect the occurrence of the network event can include receiving and analyzing at least one in-band message and at least one out-of-band message associated with the communication session;

the at least one in-band message can be at least one Real-time Transport Protocol (RTP) message;

the at least one out-of-band message can be at least one RTP Control Protocol (RTCP) message;

the first codec and the second codec, either and/or both, can be at least one of a set of codecs which have audio compression formats, text compression formats, and video compression formats;

the destination node is within at least one of the network and a second network;

modification of at least one signaling protocol can be a modification at a transport layer; and the network can include a dynamically updated traffic profile for originating and terminating communications from and to the network and to and from a second network.

In another exemplary embodiment, a method for dynamically selecting a codec for a communication session transmitted within a network via a series of network devices is provided. Such exemplary method combines the basic inventive concept(s) as embodied in the above exemplary communication node and exemplary system, as stated above.

These and other exemplary aspects of the present basic inventive concept are described below. Those skilled in the art will recognize still other aspects of the present invention upon reading the included detailed description.

DETAILED DESCRIPTION OF THE DRAWINGS

The present invention is illustrated by way of example, and not limitation, in the figures depicted in the following drawings.

Figure 1:
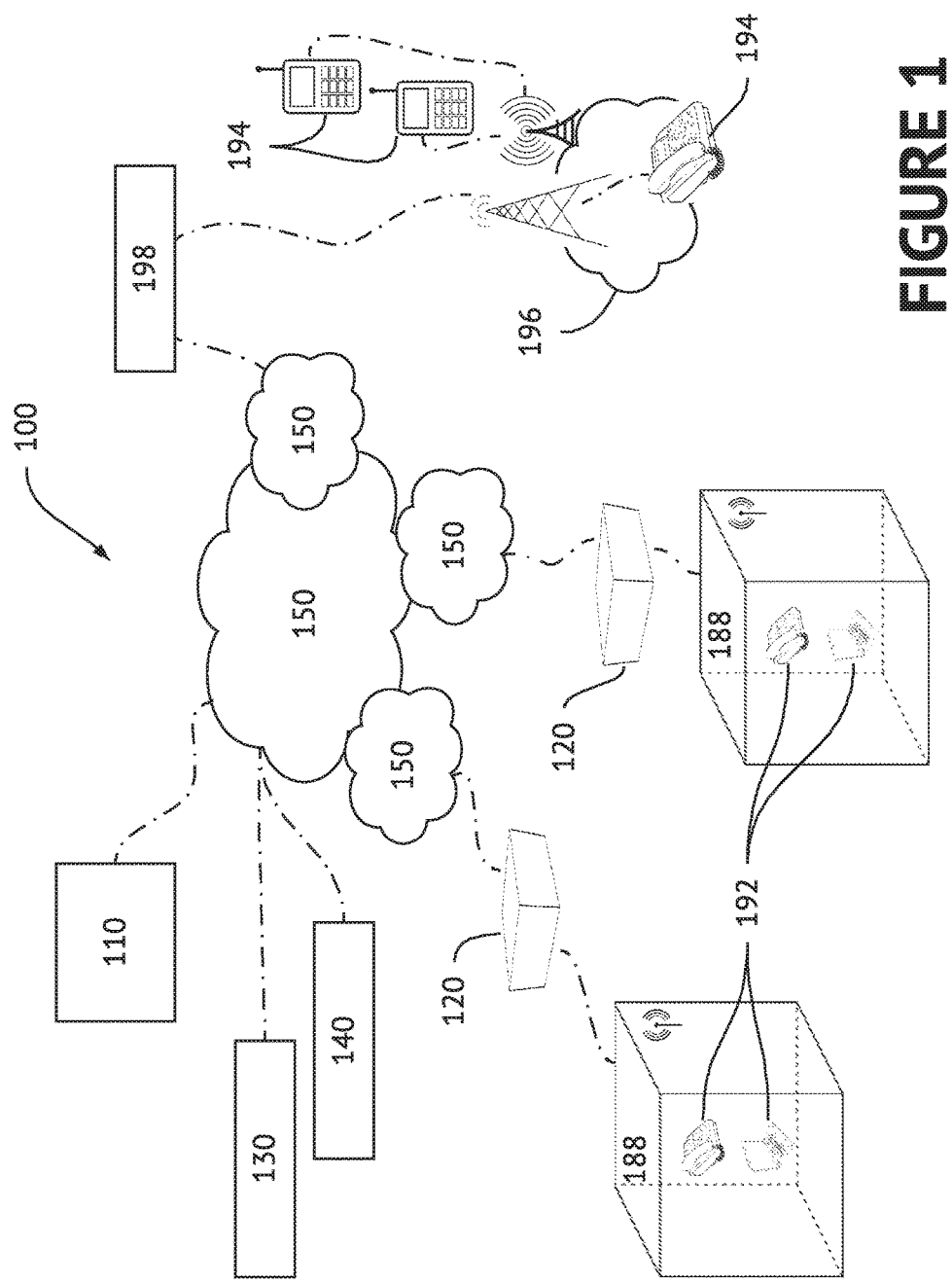
FIG. 1 illustrates by way of example a communications system environment within which the present invention may operate.
Figure 3:
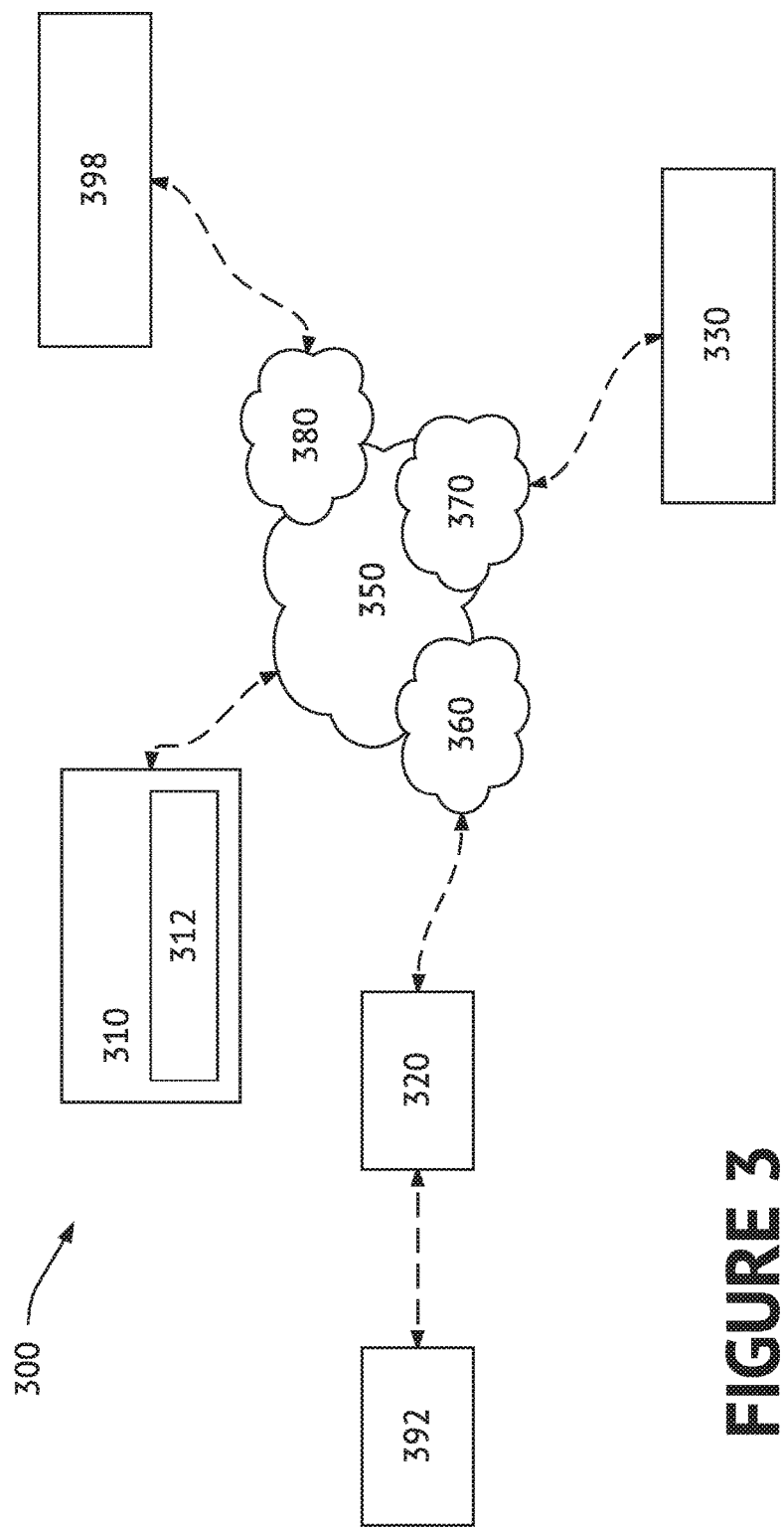

FIG. 3 illustrates one exemplary embodiment of the present invention, a system, which may comprise at least one element and/or aspect of the communications system environment illustrated in FIG. 1, in which a first codec associated with a communication session can be modified to a second codec, via a first communication node and a second communication node operably connected via at least one network.

Figure 4:
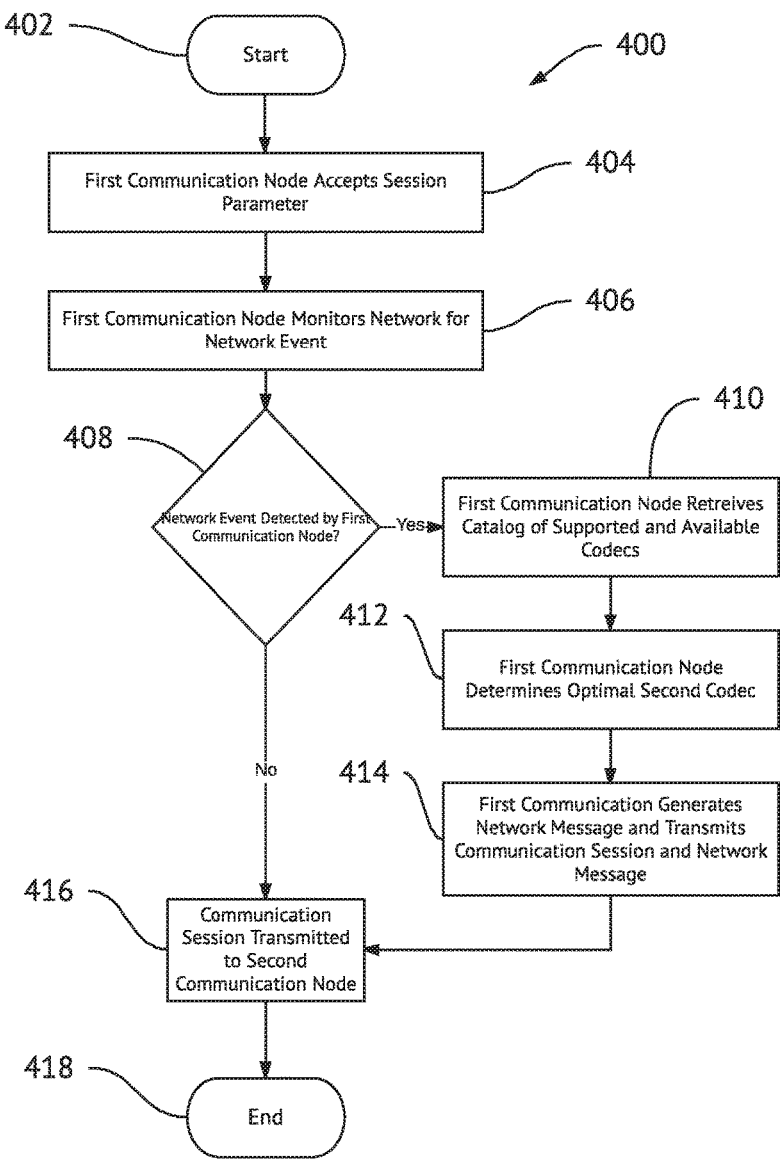

FIG. 4 illustrates one exemplary aspect of the present invention, an exemplary method for switching a codec for a communication session from a first codec to a second codec.

DETAILED DESCRIPTION OF THE INVENTION

The present invention will now be described more fully herein with reference to the accompanying drawings, which form a part of, and which show, by way of illustration, specific exemplary embodiments through which the invention may be practiced. This invention may, however, be embodied in many different forms and should not be construed as limited to the exemplary embodiments set forth below. Rather, these exemplary embodiments are provided so that this disclosure will be thorough and complete, and will fully convey the scope of the invention to those skilled in the art. Among other things, the present invention may be embodied as methods, systems, and devices. Accordingly, various exemplary embodiments may take the form of entirely hardware embodiments, entirely software embodiments and embodiments combining software and hardware aspects. The following detailed description, is, therefore, not to be taken in a limiting sense.

Throughout this specification and claims, the following terms take the meanings explicitly associated herein, unless the context clearly dictates otherwise. The phrases "in one embodiment" and "this exemplary embodiment" do not necessarily refer to the same embodiment, though they may. Furthermore, the phrases "in another embodiment," "additional embodiments," and "further embodiments" do not necessarily refer each or collectively to a different embodiment, although they may. As described below, various embodiments of the invention may be readily combined, without departing from the scope or spirit of the invention.

In addition, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes one of the exemplary embodiments of the present invention, in order to provide a basic understanding of some aspects of the invention. This brief description is not intended as an extensive overview, nor is not intended to identify key or critical elements, to delineate, or otherwise, narrow the scope. Its purpose is simply to present concepts in a simplified form as a prelude to a more detailed description which is presented later. The present invention, generally, is directed towards sending and receiving communication sessions between one or more, a plurality, more than one, but in no event less than at least one communication node, with the assistance of at least one available codec. This communication node and a system in which it may be implemented, can be directed towards providing the ability to send and receive communications sessions between communication nodes, network edge devices, and the like, using more than one codec, where the codec may optionally be selected based on any one or a combination of factors (such as, for example, network events, network conditions, communication session parameters, communication session type, and the like). This exemplary communication node and system can be especially advantageous where communication sessions need to be transferred from one location to a second using the public Internet, i.e., Internet access provided by third-party Internet service providers (ISPs). It should be noted that the exemplary communication node and system provides a dynamic methodology to allow a communication node (i.e., a first communication node) to select one or more codecs to compress and transmit the communication session signal to reduce latency, packet loss, and the like, otherwise generally known as "in an optimized fashion" or "to optimize."

Figure 2:
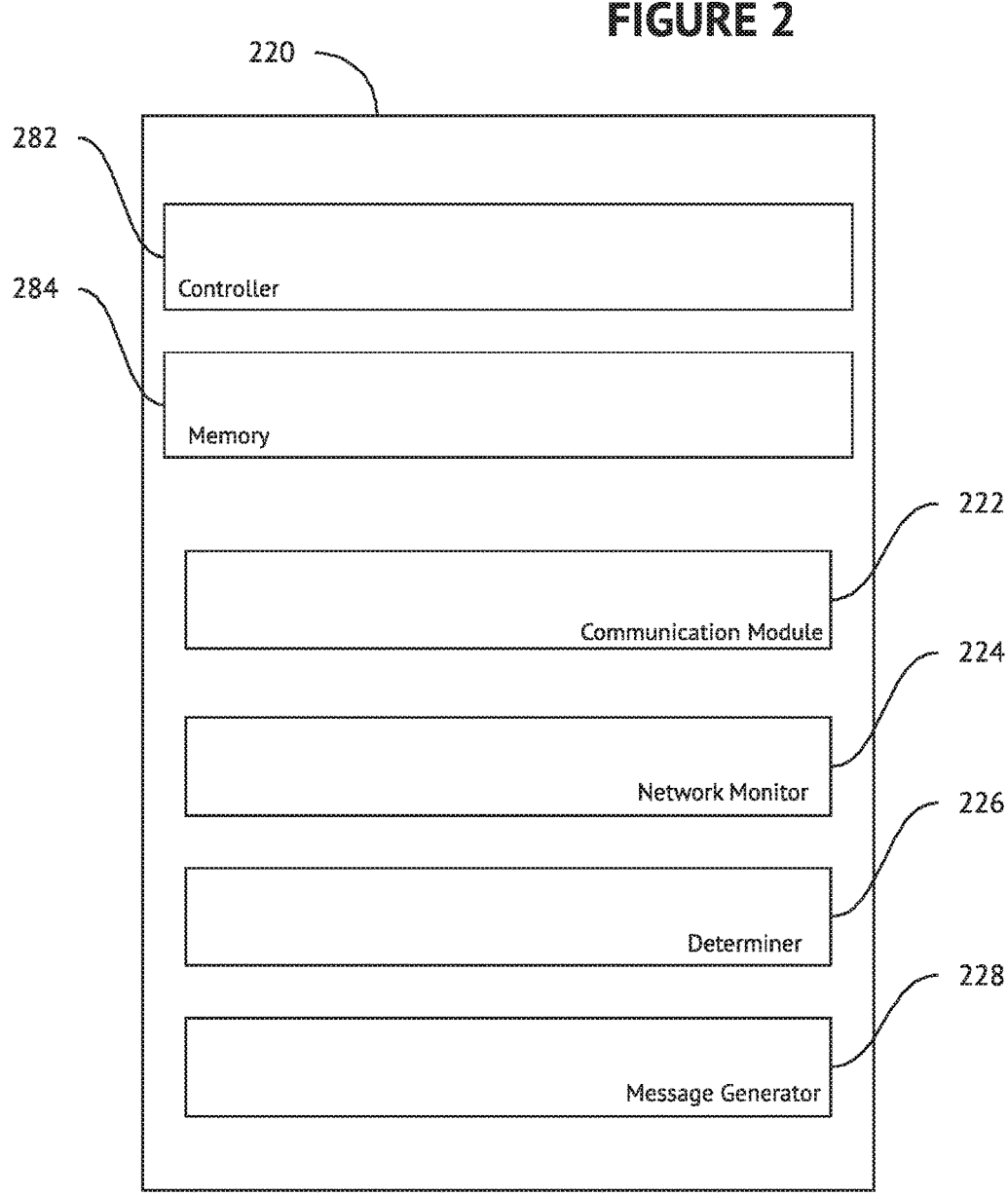
FIG. 2 illustrates an exemplary embodiment of the present invention, an exemplary communication node.

Below, exemplary embodiments will be provided in conjunction with the attached drawings. The written description below will begin with reference to FIG. 1 and will include a high-level, generalized description of a "communication system" in which the present invention can be practiced. FIGS. 2 through 4 thereafter will discuss various aspects and embodiments of the present invention, in more detail.

FIG. 1 illustrates an embodiment of a communication system 100, which is an exemplary environment in which the present inventive concept and its individual elements can be practiced, constructed and operated, in whole, in part, and in any order or combination. Communication system 100 includes an optimized communication server or "OCS" 110, communication nodes 120, 130, 140, and exemplary networks 150, 160, 170, 180. Communication system 100, generally, involves the connection of the various elements and components described herein for the transmission of communication sessions via electronic transfer of data over one or more third party networks (i.e., networks 150, 160, 170, 180), which generally includes transfer through a series of communication nodes (i.e, communication nodes 120, 130, 140). A communication session generally comprises data packets (either or both signaling and data packets) passed using a communication protocol and generally relating to one or more of the following non-exhaustive application types: audio only; audio and video; audio and data; or any combination of audio, video, and data over a digital medium. One knowledgeable in the art should understand that the phrase "communication session" is generally synonymous with the term "connection." As such, it should be realized that one exemplary embodiment of communication system 100, can include, but is not limited to, an Internet protocol (IP)-based communication system architecture that provides one or more users with an end-to-end, fully managed and monitored system for transporting audio, video, and other data traffic over third party networks.

As illustrated, communication system 100 comprises a plurality of components in addition to OCS 110, communication nodes 120, 130, 140, networks 150, 160, 170, 180, for example, facilities 188 which house one or more communication endpoints 192 (each individually an endpoint 192 or collectively endpoints 192) for providing communication sessions (i.e., both incoming and outgoing), associated with endpoints 192. Within this exemplary embodiment, communication sessions may be between the illustrated endpoints 192, between endpoints 192 and one or more endpoints 194 (each individually an endpoint 194 or collectively endpoints 194), as well as between endpoints 192, 194 and other endpoints not shown. It should be understood that a communication session between endpoints 192, 194, and endpoints not shown can be, for example, in a two-party manner, or can involve other endpoints (also not shown) in a multi-party manner, such as, in a multi-endpoint (i.e., multi-user) communication session. In this exemplary embodiment, as shown in FIG. 1, communication sessions sent or received from endpoints 192 can be managed and operated by an optimized communications server (not shown), whether or not endpoints 192 are geographically distributed across multiple facilities 188. Also, it will be understood that in alternate embodiments the endpoints 194 are not limited by connection to a traditional switched telephone network or "PSTN," such as PSTN 196, as shown in FIG. 1. For example, in such embodiments, endpoints 194 can be connected directly (i.e., without PSTN 196) to a network, such as networks 150, 160, 170, 180.

In FIG. 1, two exemplary facilities 188 are shown. But it will be understood that this is for illustrative purposes only. According to aspects of this written disclosure and the claims, endpoints are not necessarily tied to facilities, no relation necessarily exists between various facilities (not shown), and facilities 188 can be located in different geographical locations. Communication sessions involving endpoints 192 located in such facilities 188 occur via one or more networks 150, 160, 170, 180 and are typically associated with one or more of the following, by way of example and not limitation, a web-deployed service with client/service architecture, a cellular data network, a cloud-based system, secure data networks, and gateways/firewalls that provide information security, and the like. Moreover, as will be understood and appreciated, various networking components such as routers, switches, hubs, and the like, are generally also involved in transmitting communication sessions, but not illustrated for simplicity purposes.

Endpoints 192, 194 generally are defined as electrical or electronic equipment that can be connected to an IT infrastructure and that can enable electronic communications (e.g., communication sessions). For example and in no way in limitation, endpoints 192, 194 may comprise any singular or combination of a VoIP phone, a mobile phone, a fax machine, a conventional Plain Old Telephony System (POTS) phone, a smart phone, a cordless phone, a conference room speakerphone, a computer, a Bluetooth-enabled phone, a laptop, audio/video conferencing equipment, electronic gaming equipment, a printer, or more generally, any kind of computing device which can connect to a network and to or from which a user can operatively practice a communication function. Further, in locations such as facilities 188, analog or digital overhead paging systems may be utilized. Such legacy systems (including existing communications circuits that transmit data at speeds around 1.544 megabits per second, also known as "T1" circuits or POTS trunks) can be integrated with optimizing server elements (such as, for example, OCS 110) via adapters (not shown). As will be understood and appreciated, there is no limitation imposed on the number of endpoints, endpoint types, brands, vendors, and manufacturers, etc. that may be used in connection with embodiments of the present disclosure.

In a general or traditional communications network, an outgoing (which can also be known as "placed," "sent," and in purely voice sessions, "terminating") communication session will travel from endpoint 192 via one or more networks 150, 160, 170, 180 through the IP-PSTN gateways 198 where IP traffic is converted into telephony traffic and is finally delivered to endpoint 194 or another endpoint (not shown). The reverse happens for an incoming communication session (which can also be known as "received," "delivered," and in purely voice sessions "originating"). As will be discussed in reference to this FIG. 1, additional configurations of communication traffic will be illustrated, for example, generated via endpoints (not shown), and passed from communication nodes 120 to networks 150, 160, 170, 180, and thereafter routed through OCS 110. Additional embodiments contemplate communication traffic generated via endpoints 192 and passed from communication nodes 130, 140 to networks 150, 160, 170, 180. In one example, incoming traffic to facilities 188 may be directed to OCS 110 and thereafter communication nodes 130, 140 for eventual delivery to specific endpoints 192, via, for example, communication nodes 120, and the like. In an alternative example, incoming traffic may be redirected to an automated attendant, call queues, voicemail, or an off-premises device (e.g., a user's mobile phone or home phone).

Origination, as stated above, can generally be known as received, incoming voice-specific communication session, refers generally to the collecting of communication sessions, commonly voice sessions or phone calls, initiated by an endpoint user on a telephone exchange, such as, for example, PSTN 196, and handing off the calls to another endpoint, such as an Internet-enabled endpoint 192, or to another exchange or telephone company for completion to an endpoint, for example, endpoints 194, otherwise commonly known as a "called party."

In the alternative, termination, like as stated above, can be known as placed, outgoing voice-specific communication session refers to the handing off or routing of communication sessions from one service provider, which can be, for example, a telephone or Internet carrier or provider, to another service provider. In one example, the "terminating point" is an endpoint and the "originating point" is a party who initiates the communication session. Origination and termination are most generally used when referring to voice communication sessions, specifically when a voice communication session is initiated as a VoIP communication session and is terminated using the PSTN, such as for example, PSTN 196.

According to one embodiment, and as shown in FIG. 1, OCS 110 may be connected to one or more of communication nodes 120, network communication nodes 130, 140, and networks 150, 160, 170, 180. Through these connections, as shown, OCS 110 can be operatively connected to one or more of the facilities 188, and in additional exemplary embodiments, one or more remotely-located OCS server modules (not shown). Thus, endpoints 192 can be managed and controlled by OCS 110 or remotely via OCS server modules, which in this exemplary embodiment, can be network communication nodes 130, 140, via networks 150, 160, 170. In contrast and for purposes of illustration only, endpoints 194 are intended to represent endpoints that are not managed and controlled by OCS 110. In one embodiment, OCS 110 monitors and collects real-time and historical network characteristics, applies organization level methodologies for specific business requirements, embodied as executable instructions stored in a form of computer readable media related to networks 150, 160, 170, 180 characteristics, evaluates various communication session routes/paths, and if necessary modifies communication routes to account for the application of entity-specific requirements and real-time networks 150, 160, 170, 180 characteristics.

OCS 110, as shown in FIG. 1, is intended to be any singular or collection of computer servers or communication nodes that provide a suite of hosted services to create a complete, feature-rich communication system. As such, OCS 110 may comprise any combination of computing components, by way of example, but in no way required or limited to, processing units (CPUs), mass memory, buses, RAM, ROM, and other storage means (all of which are not shown for simplicity purposes). In this exemplary embodiment, mass memory may include an example of computer readable storage media for storing information such as computer-readable instructions, data structures, program modules or other data, basic input/output system ("BIOS") for controlling low-level operations of OCS 110, as well as an operating system for controlling the operation of OCS 110. It should be appreciated that these components may include a general-purpose operating system such as a version of UNIX® or LINUX™. The operating system may include, or interface with, Java virtual machine modules that enable control of either or both hardware components and operating systems operations, via Java application programs.

Additional exemplary embodiments of OCS 110 can optionally include any singular or collection of computer servers or communication nodes for storing data associated with providing communication sessions, i.e., databases further comprising directories of information identifying characteristics relating to various communication nodes, also including but not limited to, a catalog of supported or available codecs. Non-limiting examples of such directory information can include, for example, IP addresses of the respective communication nodes, a network type (i.e., which of a variety of available networks a communication is in or associated with), a codec or a set of codecs compatible with a communication node, or network, and a type of application data (i.e., audio, video, data, or any combination thereof) the respective communication node processes. Databases, in these exemplary embodiments may, in one example, be relational, which can be defined as tabular databases with data defined so that it may be reorganized and accessed in a number of ways, and in another example distributed, which can be defined as dispersed or replicated databases located among different points in the networks. These examples, however, are exemplary only and OCS 110 can have any other configuration which is operably functional for communication system 100.

In FIG. 1, as shown, communication nodes 120, 130, 140 are operatively connected to the OCS 110, via one or more networks, such as, for example, networks 150, 160, 170, including but not limited to the Internet, another public network, or a private network. In general, communication nodes 120 can be any type of IP-enabled device that connects to a network (such as networks 150, 160, 170) and enables communication sessions. As referred to throughout this specification and the claims, communication nodes 120, 130, 140 can be, but are not limited to, nodes that are "compliant" with OCS 110, which is a communication node either or both operated and managed, or capable of being controlled, managed, or manipulated by an embodiment of OCS 110, or nodes that are not compliant with OCS 110, which can be nodes which cannot be either or both operated and managed, or capable of being controlled, managed, or manipulated by an embodiment of OCS 110. Non-limiting examples of communication nodes 120, 130, 140 include network edge devices (which can be, in one exemplary embodiment, network communication nodes 130, 140), provisioning servers, route servers, media proxy servers, statistics servers, and the like.

In contrast, by way of example, communications nodes which are not compliant with OCS 110 include PSTN nodes, such as PSTN 196 and IP-PSTN gateway 198, which are ordinarily nodes that are maintained by third party ISPs, and the like, which can be connected through additional networks, such as, for example, networks 150, 180. In these exemplary embodiments, PSTN 196 and IP-PSTN gateway 198, can optionally be, for example, "destination nodes" which a communication node (i.e., communication nodes 120, 130, 140), must be able to determine acceptable codecs so that communication sessions may be optimally transmitted to them. For illustrative purposes only, and in no way in limitation, PSTN 196 and IP-PSTN gateway 198, representing what is commonly known in the art as the traditional carrier exchanges, oftentimes accept communication sessions compressed via a small selection of codecs. These codecs, as will be seen, may not provide for optimal transmission of a communication session in light of the session type, session criteria, or other network factors, such as a network event.

According to an embodiment, communication nodes 120, 130, 140 receive information relating to a plurality of network elements (not shown for simplicity purposes) via OCS 110. In additional embodiments, communication nodes 120, 130, 140 can also receive computer executable instructions which a "controller" or processing component within communication nodes 120, 130, 140 can optionally execute to dictate communication session optimization criteria, as with the inventive concept, optimized dynamic codec selection. In further embodiments, the executable instructions that dictate communication session optimization may also be stored at communication nodes 120, 130, 140.

In FIG. 1, as shown, communication nodes 130, 140 are operatively connected to OCS 110 via one or more networks 150, such as the Internet. In general, network communication nodes 130, 140 are one example of communication nodes 120 and differentiated in this specification and claims for the purpose of illustrating that communication nodes 130, 140 are separate or different from communication nodes 120 only. Likewise, communication nodes 130, 140 can also include, but not be limited to, general purpose computers, dedicated PBX servers, network-attached component devices, proxies, gateways, border controllers, or other specific computing devices or servers that can operate "OCS-compliant" or "non-OCS-compliant" applications and software. Communication nodes 130, 140, in one example, generally include at least one operative connection to one or more endpoints 192. Network communication nodes 130, 140, additionally, can be generally identified with several attributes, for example, a device identifier, a device type, a network address, a network type, a codec type or set of compatible codecs, a location, and the like.

In additional embodiments, communication nodes 130, 140 can be self-contained, compact, energy-efficient communication nodes running proprietary software from flash memory or a Solid State Drive (SSD) that provide service level guarantees to communication sessions associated with endpoints 192. In such embodiments, communication nodes 130, 140 are generally responsible for collecting networks 150, 160, 170, 180 characteristics, including but not limited to, packet loss, round trip times, transfer speed, jitter, and the like, and interact with applications running on endpoints 192 and associated network infrastructures. Generally, communication nodes 130, 140 are operatively connected to OCS 110 via networks 150, 160, 170, 180 to exchange optimal routing information on a periodic or continual basis.

One knowledgeable in the art will understand that communication nodes 130, 140, in further contemplated embodiments, can be the same as communication nodes 120, or can have the same or substantially the same functionality as communication nodes 120, but are not the same as or synonymous with communication nodes 120 in all circumstances. In additional embodiments where communication nodes 130, 140 are not the same or synonymous with communication nodes 120, communication nodes 130, 140 can optionally be operably connected to communication nodes 120 to provide collected network characteristics. As will be further discussed below, communication nodes 120, 130, 140, each individually, or in any connected combination can also monitor networks 150, 160, 170, 180 for the occurrence of network events, and the like.

According to one aspect, communication nodes 120, 130, 140 are generally used to gather information about the endpoints 192 and conditions of networks 150, 160, 170, 180 in a periodic manner to assess characteristics of potential communication paths and other network conditions. It will be appreciated by one skilled in the art that because of the complex interconnections of a large number of networks with varying network characteristics and the way information is routed through network elements, as is illustrated in one example according to a "guarantee-less paradigm" of IP generally, the quality of communication sessions occurring via networks 150, 160, 170, 180 is generally unpredictable and unreliable. For example, some nodes, one exemplary representation being communication nodes 120, 130, 140, may be down or damaged, some nodes may have faster computational capabilities over other nodes, some nodes encounter more network congestion than other nodes, some communication nodes may only accept or allow the transfer of communication sessions utilizing a specific codec, others may only be operatively functional within a public or private network, and the like. In addition to OCS 110, as presently disclosed, OCS 110 may, among other things, be used to monitor the quality of networks 150, 160, 170, 180, communication nodes 120, 130, 140 can also monitor the quality of networks 150, 160, 170, 180 to provide reliable and optimized communication sessions between endpoints, for example, endpoints 192, 194.

In additional embodiments, communication nodes 120, 130, 140 can operatively connect or "sit" on the edge of a series of communication nodes which comprise a network, which for ease of illustration a series is not depicted in FIG. 1 (e.g., as illustrated, communication nodes 120, 130, 140, are operably connected to networks 150, 160, 170, without being specifically illustrated as "within a series of communication nodes." It should be readily understood that embodiments are contemplated where this is intended, as well as additional embodiments are contemplated where this is not intended). In these embodiments, the series of communication nodes which comprise the network can be defined as a private network, otherwise known as a network that uses private IP address space, in one example including but not limited to, home, office, and enterprise local area networks (LANs) uses. In these exemplary embodiments, addresses in the private space are not allocated to any specific organization and anyone may use these addresses without approval from a regional Internet registry. However, data packets (which comprise a communication session) addressed from the private network cannot be transmitted through the public Internet, and so, if such a private network needs to connect to the Internet, it must do so via a network address translator gateway or a proxy server, which for the purpose of these additional embodiments include communication nodes 120, 130, 140. Additional embodiments of communication nodes 120, 130, 140, further comprise proxy or gateway functionality in the manner, for example, of session border control protocol or software.

It will be further understood that the terms "network," "networks," "first network," "second network," "at least one network," or "networks 150, 160, 170, 180" or each individually referenced as a network (i.e., "network 150," "network 160," "network 170," or "network 180") as used herein generally include any kind of computer-enabled, IP-enabled, or other digital network for transporting data or traffic associated with communication sessions, and generally include a network in a system of interconnected computing devices, nodes, or endpoints. As illustrated, networks 150, 160, 170, 180, each represents a connected yet different network in a series. In one example, a network includes the Internet that is a global system of interconnected computers that use the standard IP suite to serve users worldwide with an extensive range of information resources and services. It should also be understood that the term "Internet" as used herein and generally, in reality, is a network of networks consisting of millions of private, public, academic, business, and government networks, of local to global scope, that is linked by a broad array of electronic, wireless and optical technologies. As described in reference to this specification and the claims, communication nodes generally connect to networks, and networks may comprise one or more communication nodes and network edge devices as illustrated in these exemplary embodiments, for example, communication nodes 120, 130, 140, networks 150, 160, 170, 180.

Usually, such networks are offered as commoditized services by third-party Internet service providers (ISPs) and include a plurality of one or more third party sub-networks that are usually owned by third party network providers or third party carriers. Such sub-networks can be hard-wired or wireless, including but not limited to, cellular, optical fiber, Wi-Fi, WiMax®, proprietary networks, and the like, as should occur to one skilled in the art. It should also be understood by one skilled in the art that networks 150, 180 can further include PSTN nodes such as IP-PSTN gateways 198 at the boundary of IP networks, and PSTN 196 for conversions between PSTN traffic and IP traffic.

As will be described in greater detail herein, it will be understood that further embodiments provide the functionality of determining and enabling optimal communication session routes with optimal codec usage for either or both incoming and outgoing communication sessions associated with various applications (e.g., voice-based applications, video-based applications, multimedia-based applications, file download applications, email applications, etc.) and across one or more, but at least one network, such as networks 150. Such communication session routes/paths may comprise a plurality of either or both intermediary and forwarder nodes optimally configured for a plurality of codecs, via networks 150, 160, 170, 180. For purposes of this specification and as used throughout this specification and the claims, it should be noted that communication nodes 120, 130, 140, may optionally be one of an originating node, one from which a communication session is initiated, an intermediary node, one which is along the path (i.e., route) through which the communication session is routed (e.g., neither an originating or destination node), or a destination node, one at which a communication session terminates.

Once an optimal communication session route is established (with or without intermediary nodes), data associated with the respective communication session can be routed along this optimal route from the originating node or source node to the destination node or terminating node, with the communication session data compressed using one or more optimal codecs at any time during the duration of the communication session or connection. It should be understood and appreciated that the intermediate nodes can be compliant with OCS 110 or nodes that are maintained or operated by third party communication providers, such as PSTN nodes 196, 198. It should be noted that an optimized node may, for example, and as is contemplated in various embodiments of the inventive concept, may comprise one of a plurality of communication nodes (i.e., communication nodes 120) associated with a network (i.e., network 160), or may comprise one of a plurality of second communication nodes (i.e., network communication nodes 130, 140) associated with a second network (i.e., network 150).

FIG. 2 illustrates one exemplary embodiment of a communication node 220. Communication node 220, as illustrated, contains a number of computing or hardware processing elements, including but not limited to, controller 282, memory 284, communication module 222, network monitor 224, determiner 226, and message generator 228. Communication node 220, as embodied herein, can optionally have all the same or similar components as described above with reference to communication nodes 120, 130, 140 in FIG. 1. Communication node 220 may additionally comprise any combination of computing components, by way of example, but in no way required or limited to, processing units (CPUs), mass memory, buses, RAM, ROM, and other storage means (all of which are not shown for simplicity purposes). Controller 282, for purposes of this illustration, directs the overall functionality of communication node 220, as well as executes computer readable instructions stored in memory 284, which cause communication node 220 to transform a received communication session as described herein.

Controller 282 can generally be defined as the central processing unit (CPU) of communication node 220, or the electronic circuitry within communication node 220 (or any other computing device) that carries out the computer-executable instructions stored in memory 284, by performing basic operational functions, including but not limited to, for example, the basic arithmetic, logic, control and input/output (I/O) operations (if any) specified by the instructions.

Memory 284, as depicted in FIG. 2, may further comprise location(s) for operational components, application(s), software(s) and other computer executable instructions (any or all of which, as discussed above, are generally accessed from memory 284 by controller 282). Memory 284 can generally be defined as the computing hardware device or devices used to store information for immediate use in a computing device; such as communication node 220, and is commonly synonymous with the term "primary storage" or the descriptive term "storage." Memory 284, for example, operates at various speeds, such as in one example, random-access memory (RAM) which operates at a high speed, whereas other storage methods provide slow-to-access program and data storage but offer higher storage capacities. Other non-limiting examples of memory include non-volatile memory such as, flash memory, read-only memory (ROM), programmable read-only memory (PROM), erasable programmable read-only memory (EPROM), electrically erasable programmable read-only memory (EEPROM), and the like, and volatile memory such as dynamic random-access memory (DRAM), static random-access memory (SRAM), other CPU cache memory, and the like. Other types of memory can also include but are not limited to, secondary storage devices such as hard disk drives and solid-state drives, which may be wired to or wirelessly coupled to a communication node 220.

Controller 282 can access memory 284, communication module 222, network monitor 224, determiner 226, and message generator 228, each individually, one at a time, in any combination of grouping(s), and simultaneously, or in any other order or grouping as is functionally necessary to execute operations as dictated by system components (not shown), for example, such as OCS 110 or networks 150, 160, 170, 180 as illustrated in FIG. 1.

Additional embodiments of memory 284 may also comprise elements as described in reference to FIG. 2 is attached to, stored in, or otherwise associated with communication module 222, network monitor 224, determiner 226, and message generator 228. Memory 284 may further comprise additional operational elements not stated or illustrated as part of this specification, however, memory 284 is contemplated to act as a storage location for all functionally necessary elements which require storage when such elements are necessary for the functional enablement of communication node 220.

Communication session(s) can be initiated at communication node 220, by communication node 220 receiving one or more, but at least one, session parameter which includes an indication of initiation for the communication session at communication module 222. In this exemplary instance, session parameter(s) may include, but are not limited to, a session criteria, a session type, predetermined routing information for routing the communication session, and a first codec.

The computer-executable instructions stored in memory 284 can generally be defined as an instruction or set of instructions or specific criteria indicating one or more actions to be taken with respect to, which when executed can cause communication node 220 to transform communication sessions to optimized communication sessions for a given node or nodes, or obtaining and analyzing information that enables optimization of communication sessions involving the delivery of application data over third party networks. In one aspect, these computer-executable instructions stored in memory 284 and accessible to controller 282 define information needed to optimize certain communication sessions, ways to obtain such information, how to process such information, path or node ranking methodologies, and include other similar types of information. Such actions dictated by these computer executable instructions may be associated with the satisfaction of a set of communication session criteria or conditions. Computer-executable instructions, for the purposes of this specification, the claims, and as used in the exemplary embodiment illustrated in FIG. 2, generally include at least one condition and one corresponding action but may include a variety of conditions or sets of actions. These computer-executable instructions are generally predetermined or created by system administrators or system users or created on the fly by proprietary learning algorithms operating on communication nodes, and the like. Generally, these computer executable instructions are policies/criteria that govern various aspects of communication sessions.

Communication session parameters can generally be defined as information pertaining to and defining a specific communication session, and generally include various activity details relating to the communication session, such as, for example, a destination node for the communication session, an originating or sending asset or device, and the like, in addition to the different communication session attributes as described below.

Session criteria, on the other hand, can generally be defined as conditions or characteristics that are used as factors or determining criteria to optimize individual communication sessions or classes of communication sessions. Examples of communication session criteria include, but are not limited to, bandwidth requirements, a tolerable packet loss rate, one or more allowable applications, number of on-premises devices simultaneously engaged in communication sessions, a maximum tolerable delay in a voice data session, a tolerable jitter, a minimum video frame rate, allowable geographic locations of intermediate nodes, cost, and the like. Generally, session criteria can influence many factors relating to end-to-end transmission of a communication session, in one exemplary embodiment, for example, session criteria can influence the detection of a network event, as will be discussed in more detail below. In another exemplary embodiment, session criteria can also influence the application of computer executable instructions by controller 282, due to administrator restrictions placed on certain session criteria for various entity-level requirements.

Session type can be defined as a predetermined class or categorization of communication sessions. Examples of session types include, by way of example only and not in limitation, can include voice-based sessions, video-based sessions, multimedia-based sessions, file download sessions, email sessions, any partial or complete combination of these examples, and the like. Communication session type has a substantial impact on codec selection, as only certain codecs are available to certain session types or combinations of session types.

Predetermined routing information, such as, in one example, information as defined by or contained in Routing Information Protocol (RIP), is generally defined as a dynamic information protocol used to find the best route or path from end-to-end (i.e., source to destination) over a network by using a routing metric, commonly known as a hop-count algorithm. This algorithm, generally, can be used to determine the shortest path from the source to destination, which allows a communication session to be delivered at the highest speed possible, in the shortest time possible, at the lowest overall cost. Stated another way, predetermined routing information, as part of the communication session criteria, once received at communication node 220, will be analyzed as part of the dynamic codec selection process as predetermined routing information influences the intermediary or destination nodes a communication session may be transmitted to or through, and as such, may limit the availability of certain otherwise satisfactory codecs.

Predetermined routing information commonly includes port information, which for purposes of this specification and the claims, can influence codec selection. For example, a source service port can generally be defined as a communication session "endpoint" in an operating system of a computing device. In this example, a port can be associated with an IP address of a host and a session type or protocol type of a communication session, and where it is the source service port, completes the origination or source address of the communication session. The port number can be encoded in a transport protocol packet header and may be interpreted by the sending (i.e., the source or originating communication node), receiving (i.e., the destination or terminating communication node), and any intermediary communication node(s) or other network infrastructure components.

Also by way of example, a destination service port can generally be defined as the port which completes the termination address of a communication session. The port number can be encoded in the transport protocol packet header and may be interpreted by the sending (i.e., the source or originating communication node), receiving (i.e., the destination or terminating communication node), and any intermediary communication nodes or other network infrastructure components.

A first codec can generally be defined as a set of computer-executable instructions, or software, which can be used to compress or convert one signal, commonly an analog signal, into another signal type, commonly a digital signal. In general, once a signal (i.e., a communication session) is received at a destination node, the signal must be converted back to its original form, which for purposes of this exemplary embodiment, would convert a digital signal to an analog signal. It is of critical importance that the receiver (i.e., a destination node) of a communication session compressed by a codec use or have access to the same codec as the sender of the compressed data to avoid the codecs mismatching. The outcome of codec mismatching, commonly, is a terminated communication session, examples include but are not limited to a dropped phone call, a chat session being "offline," a file download which fails before completed, a video conference going black, and the like. Different examples of available codecs and their classifications, session types, criteria or requirements, and the like will be discussed in more detail with reference to FIG. 3, below.

Communication node 220 further comprises network monitor 224 to observe a network (not shown) to detect if or when a network event occurs, which, in some exemplary embodiments can be limited to only the network within which the communication session has been initiated, however additional embodiments are contemplated in which network monitor 224 observes one or more networks (as illustrated in FIG. 1, i.e., networks 150, 160, 170, 180 and FIG. 3, i.e., networks 350, 360, 370, 380) which will be discussed in more detail with reference to FIG. 3. Network monitor 224 observes the network or networks on a periodic basis. As should occur to one of ordinary skill in the art, "periodic" can be every hour, minute, virtually continuously, or the like. The period in which network monitor 224 observes the network may be determined, for example by an entity, a general network user, a network administrator, a service provider, or the like. Additional embodiments are contemplated where a network administrator may also, in addition to choosing a period of monitoring, that the network administrator may also determine additional parameters around the monitoring, for example and no way in limitation, which network or networks to monitor, weights given for certain network activities, as will be discussed below, and the like.

A network event can be defined generally as a network occurrence that warrants modification of an otherwise optimized communication session path for a given communication session. Examples of network events include but are not limited to, power outages, communication node failures, communication tower or server failures or damage, natural disasters impacting communication nodes or groups of communication nodes, routine or unscheduled maintenance associated with communication nodes, terrorist or hacker re-routing or network interruption, and virtually any other event or occurrence affecting an otherwise optimized communication session. As one knowledgeable in the art will understand from this specification and the claims, a codec in use for transmission of a communication session through a network may become an unsatisfactory codec at any time during the transmission of the communication session due to network impacting activities, such as network events. Certain codecs, for example, require specific bandwidth requirements and have very narrow throughput thresholds, which if a network event creates even a low reduction in network quality may cause the communication session to be interrupted or terminated due in part to the codec used to compress the communication session for transmission.

Upon a detection of the occurrence of a network event by network monitor 224 at communication node 220, network monitor 224 initiates an information request to a codec database (not shown) operably connected to communication node 220, to request a catalog of available and supported codecs. An information request, as used in this specification, can generally be defined as a messaging protocol used to obtain statistics relating to the request contained in the message, for example, and no way in limitation, information requests are commonly used to determine network characteristics and the like. As used by network monitor 224, an information request may contain, for example, session parameters associated with a communication session, and the like, which may limit or dictate which of the matrices of codecs (discussed below in reference to FIG. 3) that the codec database may provide to communication node 220. The codec database and catalog of available and supported codecs will be discussed in more detail below with reference to FIG. 3, specifically codec database 310 and catalog of available and supported codecs 312.

Additional embodiments are contemplated where communication node 220 receives and analyzes at network monitor 222 is at least one in-band message and at least one out-of-band message associated with a communication session as part of detecting the occurrence of a network event.

An in-band message can be defined as a signal sent to control information within a data transmission channel, generally known as a "band" or "channel" for bands or channels which transmit communication sessions with one or more session types, for example, and in no way in limitation, voice data or video data. In-band signals may often be heard by communication session users, most commonly telephony participants, commonly as tones or clicks.

Examples of in-band messages include but are not limited to Real-Time Transport Protocol (RTP) messages, Hypertext Transfer Protocol (HTTP), Simple Mail Transfer Protocol (SMTP) and the like. As one knowledgeable in the art should notice, RTP is the most common in-band message in use for communication sessions with audio, voice, or video session types. RTP is an application layer protocol for the real-time transport audio and video data and is generally equipped to handle the characteristics of Internet Protocol (IP) routing, such as recognizing and flagging, for example, missing packets, out-of-sequence aggregation of packets, and the like. Additional embodiments are contemplated where the in-band messages which communication node 220 receives and analyzes at network monitor 222 can be RTP messages.

Out-of-band messages, in contrast, are generally defined as signals sent on a "dedicated" channel (as opposed to a channel which transmits more than one session type), separate from those used for other communication session types. Examples of out-of-band messages include but are not limited to RTP Control Protocol (RTCP), File Transfer Protocol (FTP), and the like. As one knowledgeable in the art should notice, RTCP can still be used for all session types, however, limited to single channels. RTCP is a sister protocol of RTP and provides out-of-band statistics and control information from an RTP session. RTCP partners with RTP in the delivery and packaging of multimedia data, but does not transport any media data itself. The primary function of RTCP is generally to provide feedback on the quality of service in a media distribution (i.e., transmission of a communication session which one or more session types) by periodically sending statics information to participants in a streaming communication session with one or more session types. RTCP statistics can include but are not limited to, transmitted octet and packet counts, packet loss, packet delay variation, round-trip delay time, and the like. Unlike in-band messages, out-of-band messages, such as, for example, RTCP, are inaccessible to communication session participants (i.e., do not create sound or visual recognition cues). RTCP is generally not a commonly used protocol for collecting network data, nor is data collected via this protocol commonly used for the purposes of determining a network event or network conditions.

Communication node 220 further comprises a determiner 226, which once communication node 220 receives the catalog of available and supported codecs from the codec database, selects a second codec from the catalog of available and supported codecs. For purposes of this written specification and the claims, a "second codec" is defined simply to differentiate the selected codec from the "first codec." In this exemplary embodiment, determiner 226 selects the second codec based at least in part on a prioritization of the catalog of available and supported codecs, the network event, the session type, the session criteria, and the predetermined routing information for routing the communication session, via application of an algorithm, which may can have fulfill entity-specific requirements to address the specific needs of entity-level users, as determined by a network administrator, or the like. In one exemplary embodiment, determiner 226 may have predefined parameters, for example, as set by a network administrator for a service provider, which determines various weighted values for prioritization of the catalog of available and supported codecs, which types of network events are considered higher exposure, and the like.

Additional embodiments are contemplated where determiner 226 selects a second codec based on a dynamic or network information-selected algorithm, which may be dynamically updated, i.e., create different weighted values, during periods of various network configurations.

Communication node 220 also comprises a message generator 228 which, once a second codec is selected by determiner 226, creates a network message directing a second communication node (not shown) to replace the first codec with the second codec. A network message, for purposes of this specification and the claims can be generally defined as a specially formatted data describing events, requests, or replies, which can act as a message flag or message exchange between applications operating within computing devices, for example communication node 220 and a second communication node (not shown).

Replacement of the first codec with the second codec, as contemplated in this exemplary embodiment, includes, but is not limited to a modification of at least one signaling protocol of the communication session to remove the first codec, integrate the second codec, and indicate the second codec for reception at a destination node. Additional embodiments are contemplated where the modification occurs at a transport layer.

A transport layer protocol can be defined as implementation instructions which define a set of functionality associated with defining host-to-host communication services or applications between one or more communication nodes like communication node 220, such as, for example, connection-oriented data stream support, reliability support, data flow control, multiplexing, and the like. According to the Open Systems Interconnection model (OSI model), a transport layer is an abstraction layer which is responsible for delivering data to an appropriate application process on one or more "host" computing devices, such as, for example, but not limited to, one of a next hop or other intermediary communication node or a destination node. To accomplish this data delivery, or transport, a transport layer can include any number or implementation instructions or protocols which direct statistical multiplexing of data from different application processes. Data multiplexing, in these exemplary embodiments, can be defined as combining any combination of analog or digital data signals or communication sessions into a single signal. This can include but is not limited to forming data packets and either simultaneously or thereafter adding source and destination port numbers in the header of each transport layer data packet. For these exemplary embodiments, the originating and destination IP address(es), the port numbers, the multiplexed data signal, and an indication of a codec in use to compress the communication session data can constitute what is generally known in the industry as a network socket, otherwise defined as an identification address of a "process-to-process" communication session. In the OSI model, the actual process-to-process communication session identified by the transport layer address is functionality supported at a session layer.

The implementation instructions or protocols, in one exemplary embodiment, can be a User Datagram Protocol (UDP). A UDP is a transmission protocol which, for example, provides one or more algorithms to verify data integrity and uses port numbers for addressing different functions at a source communication node, intermediary communication node, and destination communication node for the particular datagram, and the like. In these exemplary embodiments, a UDP generally has no introduction or "handshaking" dialogues, so there is no guarantee of delivery, ordering, or duplicate protection and is commonly suitable for purposes where error checking and correction is either not necessary or is performed at an application, avoiding the overhead of such processing at the network interface level.

Commonly, networks, such as, for example, networks 150, 160, 170, 180 illustrated in FIG. 1, and other time-sensitive applications often use a UDP because dropping packets is preferable to waiting for delayed packets, which may not be an option in a real-time system, independent of the codec used to compress communication sessions across those networks. Additional embodiments are contemplated, where, due to a dynamic codec selection and modification of the transport layer, (i.e., a UDP) at communication node 220, for example, may direct communication sessions containing UDP transport protocol(s) to either or both limit or substantially eliminate such packet dropping and delay based on which of a second codec is selected.

Additional embodiments are further contemplated where modification of a signaling protocol occurs at communication node 220, with no network message needing to be created to notify a second communication node to modify the at least one signaling protocol. In these exemplary embodiments, communication node 220 can optionally have additional elements which represent a modifier function, the same or substantially similar as that referenced below in FIG. 3 associated with second communication node 330.

FIG. 3 illustrates one exemplary embodiment of a system 300 for dynamically selecting a codec for a communication session transmitted within a network. System 300, as illustrated, comprises a number of network elements, including, but not limited to, communication endpoint 392, codec database 310, first communication node 320, second communication node 330, networks 350, 360, 370, 380, and third communication node 398. System 300 may additionally comprise any combination of network elements or computing components, by way of example, but in no way required or limited to, CPUs, mass memory(ies), gateway(s), proxy(ies), NAT implementation(s), firewall(s), and the like.

For purposes of this exemplary embodiment, it is contemplated that a communication session can be initiated (i.e., sourced, terminated, etc.) originally from communication endpoint 392, thereafter received at first communication node 320 for transmission through networks 350, 360, 370 to a destination node (i.e., third communication node 398).

First communication node 320, in this exemplary embodiment, optimally has the same or substantially similar functionality to communication node 220, as illustrated in FIG. 2, and therefore comprises the capabilities to receive session parameters relating to the communication session, such as, for example, a session criteria, a session type, predetermined routing information for routing the communication session, and a first codec. First communication node 320 is further capable of monitoring network 350, 360, 370, 380 for the occurrence of a network event. If a network event is detected, communication node 320 is operably connected so as to be able to communicate with codec database 310, retrieve a catalog of available and supported codecs 312 from codec database 310, and thereafter select a second codec which is optimal for the communication session, generate a network message to attach to the communication session and transfer the communication session and network message to second communication node. Following this exemplary methodology, second communication node 330 may interpret the network message generated by communication node 320, and thereafter modify the communication session by removing the first codec from the session data without altering the state of the session data, and thereafter replacing the first codec with the second codec noticed in the network message. Second communication node 330 may, optionally, thereafter route the communication session to third communication node 398, via networks 350, 360, 370, 380, which third communication node 398 can also be considered a destination node.

Endpoint 392 can generally be defined as electrical or electronic equipment that can be connected to an IT infrastructure and that can enable electronic communications (e.g., communication sessions). For example, and in no way in limitation, endpoint 392 may comprise any singular or combination of a VoIP phone, a mobile phone, a fax machine, a conventional Plain Old Telephony System (POTS) phone, a smart phone, a cordless phone, a conference room speakerphone, a computer, a Bluetooth®-enabled phone, a laptop, audio/video conferencing equipment, electronic gaming equipment, a printer, or more generally, any kind of computing device which can connect to a network and to or from which a user can operatively practice a communication function. As will be understood and appreciated, there is no limitation imposed on the number of endpoints, endpoint types, brands, vendors, and manufacturers, etc. that may be used in connection with embodiments of the present disclosure. As such, additional embodiments are contemplated where system 300 further comprises one or more, a plurality, but in no event less than at least one endpoint 392.

Codec database 310, as illustrated in FIG. 3, is intended to be any singular or collection of computer servers or communication nodes that may comprise any combination of computing components, by way of example, but in no way required or limited to, processing units (CPUs), mass memory, buses, RAM, ROM, and other storage means (all of which are not shown for simplicity purposes). In this exemplary embodiment, mass memory may include an example of computer readable storage media for storing information such as computer-readable instructions, data structures, program modules or other data, basic input/output system ("BIOS") for controlling low-level operations of codec database 310, as well as an operating system for controlling the operation of codec database 310. It should be appreciated that these components may include a general-purpose operating system such as a version of UNIX® or LINUX™. The operating system may include, or interface with, Java virtual machine modules that enable control of either or both hardware components and operating systems operations, via Java application programs.

Additional exemplary embodiments of codec database 310 can optionally include any singular or collection of computer servers or communication nodes for storing data associated with providing communication sessions, i.e., databases further comprising directories of information identifying characteristics relating to various communication nodes, also including but not limited to, a catalog of supported and available codecs 312. Non-limiting examples of such directory information can include, for example, IP addresses of the respective communication nodes (such as, for example, first communication node 320, second communication node 330, or third communication node 398), a network type (i.e., which of a variety of available networks a communication is in or associated with), in one example, networks 350, 360, 370, 380, a codec or a set of codecs compatible with communication node(s), or networks, and a type of application data or session type (i.e., audio, video, data, or any combination thereof) the respective communication node(s) process. Databases, in these exemplary embodiments may be, in one example, relational, which can be defined as tabular databases with data defined so that it may be reorganized and accessed in a number of ways, and in another example distributed, which can be defined as dispersed or replicated databases located among different points in the networks. These examples, however, are exemplary only, and catalog of available and supported codecs 312, as well as codec database 310, can have any other configuration which is operably functional for system 300.

Additional embodiments are contemplated where codec database 310 provides additional features or functionality as part of system 300, since codec database 310 can optionally be operably connected to networks 350, 360, 370, 380, which, in turn, provides operable connection to other network elements, such as, for example, first communication node 320, second communication node 330, or third communication node 398. In these exemplary embodiments, codec database 310 may also be operably connected to additional network elements (not shown), including but not limited to, gateways, proxies, network monitors, additional database servers, or other communication nodes (not shown). Codec database 310, therefore, may store or share additional network 350, 360, 370, 380 characteristics as part of, for example, information requests, and the like.

Additional embodiments further contemplate where codec database 310 further has the same or similar functionality to first communication node 320 or second communication node 330. In these exemplary embodiments, codec database 310, first communication node 320, or second communication node 330 are each "virtual" elements of the same computing device. It is further contemplated that codec database 310 can "sit" on an edge of a network, such as, for example, networks 350, 360, 370, 380, and can act as a gateway or proxy, by, in one example, execution of a proxy protocol such as session border control or similar.

Catalog of available and supported codecs 312 can comprise a complete list of available and supported codecs indexed in a systematic order, according to any combination but at least one of the following: throughput threshold, latency threshold, session type, session criteria, and the like. A codec, also known as a "coder-decoder," as briefly discussed above with reference to FIG. 1, can generally be defined as a piece of software that is used to compress or convert an analog voice signal into a digitally encoded version that is ready for transmission. Once the data has been received, the receiving codec will convert the digitally encoded version of the voice signal back into an analog signal. Codecs and the associated call quality can vary significantly following compression and transmission, which offers the organizations using them the flexibility to choose a codec that allows them to optimize the bandwidth used for transmission and computational power required to achieve the desired communication session quality.

It is of critical importance to ensure that the receiver of the compressed data is using, or has access to the same codec as the sender of the data to avoid mismatching codecs. The outcome of a codec mismatch would be that both ends of the transmission wouldn't be able to negotiate the same codec and the call will not complete.

Voice transmission is analogical, whereas a network through which data is commonly transported is digital. The process to sample analogical waves into digital information is made by the codec. There are many standards to sample an analogical voice signal into a digital one. The process is often quite complex. A non-exhaustive list of codecs can include, but is not limited to, G.711, G.723, G.723.1, G.726, G.729, H.323, iLBC, WebRTC, OPUS, iSAC, VP8, and the like.

G.711 is an ITU Telecommunication Standardization Sector (ITU-T) standard for audio compounding. It is primarily used in telephony. The ITU-T is one of the three sectors (divisions or units) of the International Telecommunication Union (ITU), and it coordinates standards for telecommunications. G.711 represents logarithmic pulse-code modulation (PCM) samples for signals of voice frequencies, sampled at the rate of 8000 samples/second. There are two main algorithms defined in the standard, the p-law algorithm (used in, for example, North America and Japan) and A-law algorithm (used in, for example, Europe, and all other digitally connected countries). Both are logarithmic, but A-law has generally been designed to be simpler for a computer to process. The standard also defines a sequence of repeating code values which define the power level of 0 decibels. The p-law and A-law algorithms encode 14-bit and 13-bit signed linear PCM samples (respectively) to logarithmic 8-bit samples. Thus, the G.711 encoder will create a 64 kilobit per second bit stream for a signal sampled at 8 kilohertz.

G.723 is an ITU-T standard wideband speech codec and is an extension of Recommendation G.721 (which was folded into G.726, discussed below, as of 1990), an adaptive differential pulse code modulation, for 24 and 40 kilobits per second digital circuit multiplication equipment applications. G.723 has been superseded by G.726 but is still used for certain private or LAN-based networks. G.723.1 is an audio codec for voice that compresses voice audio in 30-millisecond frames. There are two-bit rates at which G.723.1 can operate: 6.3 kilobits per second (using 24-byte frames) using an MPC-MLQ algorithm (MOS 3.9) and 5.3 kilobits per second (using 20-byte frames) using an ACELP algorithm (MOS 3.62). G.723.1 is mostly used in Voice over IP (VoIP) applications due to its low bandwidth requirement. Music or tones, such as dual-tone-multi-frequency signaling (DTMF) or fax tones (i.e., signals generated by pressing a traditional handset or fax's touch keys), cannot be transported reliably with this codec, and thus some other method such as G.711 or out-of-band methods can be used to transport these signals.

G.726 is an ITU-T adaptive differential pulse-code modulation (ADPCM) speech codec standard covering the transmission of voice at rates of 16, 24, 32, and 40 kilobits per second. It was introduced to supersede both G.721, which covered ADPCM at 32 kilobits per second, and G.723, which describes ADPCM for 24 and 40 kilobits per second. G.726 also introduced a 16 kilobits per second version. The four-bit rates associated with G.726 are often referred to by the bit size of a sample, which are 2-bits, 3-bits, 4-bits, and 5-bits respectively. The most commonly used mode is 32 kilobits per second since this is half the rate of G.711, which in operation may increase the usable network capacity by 100%.

G.729 is an audio data compression algorithm for voice that compresses voice audio in chunks of to milliseconds. Music or tones such as DTMF or fax tones cannot be transported reliably with this codec, and thus use G.711 or out-of-band methods to transport these signals. G.729 is mostly used in Voice over IP (VoIP) applications for its low bandwidth requirement. Standard G.729 operates at 8 kilobits per second, but there are extensions, which provide also 6.4 kilobits per second and 11.8 kilobits per second rates for marginally worse and better speech quality, respectively. Also very common is G.729a which is compatible with G.729, but requires less computation. This lower complexity bears the cost of reduced communication session quality. The use of G.729 may require a license fee or royalty fee.

H.323 is an umbrella recommendation from the ITU-T that defines the protocols to provide audio-visual communication sessions on any packet network. H.323 can be implemented by various Internet real-time applications such as "NetMeeting" and "Ekiga (via an OpenH323 implementation)." H.323 is a part of the H.32x series of protocols which also address communications over Integrated Services Digital Network (ISDN), Public Switched telephone network (PSTN) or Signaling System 7 (SS7). H.323 is commonly used in VoIP and Internet Protocol (IP)-based videoconferencing. Its purpose is thus similar to that of the Session Initiation Protocol (SIP).

Internet Low Bitrate Codec (iLBC) is an open source, royalty-free, narrowband, speech, and audio coding format codec and reference implementation, developed by Global IP Solutions (GIPS) formerly Global IP Sound (acquired by Google Inc. in 2011). It was formerly freeware with limitations on commercial use, but since 2011 it has been available under a free software/open source (3-clause BSD license) license as a part of the open source WebRTC (discussed below) project. iLBC is suitable for VoIP applications, streaming audio, archival and messaging. The algorithm is a version of block-independent linear predictive coding, with the choice of data frame lengths of 20 and 30 milliseconds. The encoded blocks have to be encapsulated in a suitable protocol for transport, usually the Real-time Transport Protocol (RTP). iLBC handles lost frames through graceful speech quality degradation. Lost frames often occur in connection with lost or delayed IP packets. Ordinary low-bitrate codecs exploit dependencies between speech frames, which cause errors to propagate when packets are lost or delayed. In contrast, iLBC-encoded speech frames are independent and so this problem will not occur.

WebRTC is an open framework for the Internet that enables real-time communications via an Internet web browser. It includes the fundamental building blocks for high-quality communications on the web, such as network, audio and video components used in voice and video chat applications. These components, when implemented in a browser, can be accessed through a JavaScript application programming interface (API), enabling developers to easily implement their own RTC web app. The WebRTC effort is being standardized on an API level at the World Wide Consortium (W3C) and at the protocol level at the Internet Engineering Task Force (IETF).

Opus is a royalty-free audio codec defined by IETF RFC 6176. It supports constant and variable bitrate encoding from 6 kilobits per second to 510 kilobits per second, frame sizes from 2.5 milliseconds to 60 milliseconds, and various sampling rates from 8 kilohertz (with 4 kilohertz bandwidth) to 48 kilohertz (with 20 kilohertz bandwidth, where the entire hearing range of the human auditory system can be reproduced).

iSAC is a robust, bandwidth-adaptive, wideband and super-wideband voice codec developed by Global IP Solutions, and is used in many Voice over Internet Protocol (VoIP) and streaming audio applications. iSAC is used by industry leaders in hundreds of millions of VoIP endpoints. This codec is included as part of the WebRTC project. Similarly, VP8 is a highly efficient video compression technology developed by the WebM Project. VP8 can be one of the video codecs included with WebRTC.

Catalog of available and supported codecs 312 can optionally be prioritized by the codec database 310 based on a throughput threshold. Throughput or network throughput can generally be defined as the rate of "successful" communication session delivery over a communication channel. Throughput is commonly measured in bits per second, but can also be measured in data packets per second or data packets per time slot. A throughput threshold, therefore, is often a "maximum" limit of bits per second or data packets per second that are required to be passed through a network for the communication to be successfully delivered, as compared to a "minimum" limit of bits per second or data packets per second. Maximum thresholds, in the context used in this written description and the claims, define a scope or range of values up to and including an optimal value. Often times, for sake of description, a communication session may be dropped during transmission via networks 350, 360, 370, 380 if a latency threshold is reached or exceeded.

Additional embodiments are contemplated where catalog of available and supported codecs 312 can optionally be prioritized by the codec database 310 based on a latency threshold. Latency can generally be defined as the delay before a transfer of a communication session begins, following an instruction for its transmission. Latency in a packet-switched network, such as, for example, networks 350, 360, 370, 380, can be measured based on the time from the source sending a packet to the destination receiving it, which is a "one-way" measurement, as well as the one-way latency from source to destination plus the one-way latency from the destination back to the source, which is a "round-trip" measurement. Round-trip latency is more commonly measured, as it may be measured from a single point (instead of, for example, from one or more, or two or more locations). Many networks, such as networks 350, 360, 370, 380, provide a notification, commonly called a "Ping" which may be used to measure round-trip latency. A Ping performs no data packet processing; it is generally only a response back when a packet is received. A Ping is generally not an accurate measurement, but a rough time estimate.

In a non-trivial network, such as networks 350 360, 370, 380, which handle various communication sessions with various session types, a typical data packet will be forwarded over many links via many gateways, each of which will not begin to forward the packet until it has been completely received. In such a network, the minimal latency is the sum of the minimum latency of each link, plus the transmission delay of each link except the final one, plus the forwarding latency of each gateway. Since typically only one packet can be transmitted at a time, some of the packets must queue for transmission, incurring an additional delay. Processing delays are incurred while a gateway determines what to do with a newly received packet. A new and emergent behavior called buffer bloat can also cause increased latency that is an order of magnitude or more. The combination of propagation, serialization, queuing, and processing delays often produce a complex and variable network latency profile.

Additional embodiments of the type(s) of network messages which are monitored to determine throughput and latency are discussed in more detail above, with reference to FIG. 2.

Yet still further embodiments are contemplated where catalog of available and supported codecs 312 can optionally be prioritized on either or both of the throughput threshold or the latency threshold. In these exemplary embodiments, codec database 310 may employ additional functionalities to monitor networks 350, 360, 370, 380, for the various elements which comprise either or both of throughput and latency.

Further embodiments are also contemplated where codec database 310 dynamically chooses the throughput threshold, based at least in part on various factors, such as, for example, the information request sent by first communication node 320, session type for the communication session, session criteria, and the like. In these exemplary embodiments, codec database 310 may additionally collect and store network data relating to a matrix or "set" of throughput values, based at least in part on a range of session types, a range of session criteria, at least one network condition, and the like. Codec database 310 may, for example, determine the throughput threshold from the set of throughput thresholds based on the communication session. In this specific example, the information request from first communication node 320 would include an indication of at least one of the session parameter(s) for the communication session, which session parameter may be directly impacted by meeting or exceeding the throughput threshold.

Likewise, other embodiments are also contemplated where codec database 310 dynamically chooses the latency threshold, based at least in part on various factors, such as, for example, the information request sent by first communication node 320, session type for the communication session, session criteria, and the like. In these exemplary embodiments, codec database 310 may additionally collect and store network data relating to a matrix or "set" of latency values, based at least in part on a range of session types, a range of session criteria, at least one network condition, and the like. Codec database 310 may, for example, determine the latency threshold from the set of latency thresholds based on the communication session. In this specific example, the information request from first communication node 320 would include an indication of at least one of the session parameter(s) for the communication session, which session parameter may be directly impacted by meeting or exceeding the latency threshold.

First communication node 320 can be operably connected to communication endpoint 392 as well as operably connected to codec database 310, via a network, for example, networks 350, 360, 370, 380. It is further contemplated that first communication node 320 have the same, substantially the same, or similar functionality to communication node 120, 220, as illustrated in more detail with reference to FIGS. 1 and 2. First communication node 320, in addition to operability as described with reference to FIG. 2 (i.e., communication node 220), can either or both accept a session parameter indicating initiation of a communication session as well as transmit a communication session, i.e., to a second communication node such as, for example, second communication node 330, or another destination node, such as, for example, third communication node 398.

Second communication node 330 can be operably connected to first communication node 320 via a network, for example, networks 350, 360, 370, 380, and may further comprise, in one exemplary embodiment, a codec modifier which can be operable to replace a first codec with a second codec based on the network message generated by first communication node 320. Replacement, as used in this written specification and the claim, can include modifying one of, one or more, more than one, but at least one of a communication session's signaling protocol(s) to withdraw the first codec without altering the communication session, integrate the second codec, and indicate the second codec for reception at a destination node, such as for example, third communication node 398.

Second communication node 330 can optionally receive a communication session and an associated network message from first communication node 320 as well as transmit the communication session to a destination node, such as, for example, third communication node 398. Second communication node 330 is optimally considered to have functionality the same as, substantially similar to, or similar to communication nodes 130,140, as described in more detail with reference to FIG. 1.

Additional embodiments are contemplated where second communication node 330 further comprises a second message generator for creating a second network message to notify a third communication node (not shown) to switch the second codec to the first codec if the destination node (i.e., third communication node 398) only accepts communication sessions compressed using the first codec.

Additional embodiments are further contemplated where an additional communication node (not shown), may be required to have the functionality to operably receive a communication session with the signaling protocol modified (i.e., where the first codec has been replaced with the second codec). This additional communication node can further comprise a codec modifier to replace the second codec with the first codec based on a network message created and transmitted by second communication node 330. For purposes of this written description and the claims, replacement includes a modification of signaling protocol to withdraw the second codec without altering the communication session, integrate the first codec, and indicate the first codec for reception at a destination node, such as, for example, third communication node 398.

Third communication node 398, in this exemplary embodiment, can be defined as a communication node that is maintained by a third party ISP, and the like, which can be connected to a network, such as, for example, networks 350, 360, 370, 380. In this exemplary embodiment, third communication node 398, can optionally be, for example, a "destination node." A communication node (i.e., communication nodes 320, 330), as part of this exemplary system, should be able to determine at least one acceptable codec for third communication node 398, so that communication sessions may be optimally transmitted to it. For illustrative purposes only, and in no way in limitation, third communication node 398, represents what is commonly known in the art as a traditional carrier exchange, oftentimes accepting communication sessions compressed using only a small selection of codecs. Additional embodiments of third communication node 398 are contemplated where third communication node 398 resides in the network, such as, for example, networks 350, 360, 370, 380 or another network (not shown), which may require additional functionality of communication nodes, i.e., first communication node 320 or second communication node 330, to address transmission to the another network.

Additional embodiments are further contemplated where a network, such as, for example, networks 350, 360, 370, 380, can have either or both of a predetermined or dynamically updated traffic profile for originating and terminating communications from and to the network and to and from a second network. Traffic profiles generally refer to the mean rate and the variability of the traffic rate over time. Applications operational within a network commonly generate specific source traffic profiles, from which they may be classified, for example, as narrow, broadband, constant bit rate, variable rate, or the like. Traffic profiles are also measured for aggregated traffic on transmission links. Traffic profiles can have a substantial impact on the route of a communication session, specifically during the occurrence of a network event.

FIG. 4 provides for an exemplary method 400 for dynamically selecting a codec for a communication session transmitted within a network via a series of network devices.

Method 400 starts at 402, and at 404 a first communication node accepts a session parameter initiating a communication session. The session parameter contains a series of information about the communication session, including but not limited to, a session criteria, a session type, predetermined routing information for routing the communication session, and a first codec, all of which are defined above with reference to FIGS. 2 and 3.

Additional session parameters are further contemplated, where a first communication node may have additional and different functionalities as those described with reference to FIGS. 1 through 3, above. Non-limiting examples include an address family type (i.e., whether or not an IP address is IPv4, IPv6, or other), a source network type (i.e., whether a source network is public, private, or other), a destination network type, and the like. The first communication node, in this non-limiting example, may have the additional functionalities to complete routing or network translation services, for example, act as a network address translation (NAT) implementation sitting as an edge device of a private network, act as a proxy, act as a gateway, and the like.

At 406, a first communication node monitors a network, at least in part, to observe the network and detect if a network event occurs. If a network event is detected at 408, the first communication node sends an information request at 410 to an operably connected codec database, requesting to transfer from the codec database to the first communication node a catalog of available and supported codecs, in addition to providing the codec with a set of informational data, which the codec database may optionally use to determine which of the set(s) of available codec catalogs is available to transmit to the communication node. A codec database or catalog of available and supported codecs may be the same, substantially similar or different to those described with reference to FIG. 3. It is contemplated, for purposes of this written specification and the claims, that the codec database is accessible to the first communication node for the purposes of obtaining the catalog of available and supported codecs, however, additional functionality between the two network elements is also contemplated. In one non-limiting example, a first communication node may have additional functionality, for example, acting as a gateway or proxy, and may inquire into the codec database for additional network information as part of the request for the catalog of available and supported codecs.

If the information request at 410 contains information which would allow the codec database to adequately determine a catalog of avail and supported codecs, the codec database thereafter transfers the catalog of available and supported codecs to the first communication node. Additional embodiments are contemplated where the codec database and the first communication node may be virtual elements of the same device (i.e., reside in the same location as part of the same communications equipment) or even the catalog of available and supported codecs resides as one element of the first communication node. In these exemplary embodiments, it is further contemplated that an information request or transfer of the catalog may not be needed.

If a network event is not detected by a first communication node when it receives a communication session, according to this exemplary method 400, the communication node thereafter at 416 transmits the communication session to a destination node. Method 300 thereafter ends at 418.

Additional embodiments are contemplated where monitoring the network to detect the occurrence of the network event may further include receiving and analyzing in-band message(s) and out-of-band message(s) as they are associated with a communication session. Yet still further embodiments contemplate that at least one of the in-band messages can be an RTP message and that at least one of the out-of-band messages can be an RTCP message. RTP and RTCP messages are discussed in more detail with reference to FIG. 2, above.

At 412, a first communication node determines a second codec from the catalog of available and supported codecs. Determination, for the purposes of this written specification and the claims, can include selecting the second codec based, at least in part, on a prioritization of the catalog of available and supported codecs, the network event, the session type, the session criteria, and the predetermined routing information for routing the communication session.

Additional embodiments are contemplated where the first codec or the second codec can be an audio compression format, a text compression format, a video compression format, any combination of these, or the like.

At 414 a first communication node may generate a network message directing a second communication node within the network to replace the first codec with the second codec. Replacement, as contemplated as part of this specification and the claims, includes a modification of a signaling protocol of the communication session to remove the first codec, integrate the second codec, and indicate the second codec for reception at a destination node.

At 416 a first communication node transmits the communication session and the network message to a second communication node, so that a modification may be completed. Method 400 thereafter ends at 418.

Additional embodiments contemplate modifying the communication session at the second communication node to replace the first codec with the second codec based on the network message. In these embodiments, replacement can include a modification of a communication session signaling protocol to withdraw the first codec without altering the communication session, integrate the second codec, and indicate the second codec for reception at a destination node, and this second communication node transmits the communication session to the destination node. Further embodiments contemplate modification of at least one signaling protocol further being a modification at a transport layer. Modification of the transport layer is discussed in more detail with reference to FIG. 2, above.

Yet still additional embodiments of the inventive method contemplate generating a second network message at a second communication node to notify a third communication node to switch the second codec to the first codec if a destination node only accepts communication sessions utilizing a first codec (i.e., not the codec the communication session is currently compressed using, e.g., the "second" codec). In these exemplary embodiments, it is contemplated that modifying the communication session occurs at the third communication node to replace the second codec with the first codec based on a network message created and transmitted by the second communication node. For purposes of these exemplary embodiments, replacement of the second codec with the first codec can include a modification of the same signaling protocol to withdraw the second codec without altering the communication session, integrate the first codec, and indicate the first codec for reception at a destination node which accepts only the first codec.

Additional embodiments are further contemplated where a destination node accepts neither the first codec nor the second codec. In these exemplary embodiments, a third communication node may, based on a second network message or another network message (i.e., a network message or response message received from the destination node), dynamically switch the second codec with yet still another codec which can be accepted by the destination node. It is contemplated, in these instances, that the third communication node may have access to a catalog of available and supported codecs from another communication node, for example, the codec database or the like.

Additional embodiments are contemplated where the destination node is within at least one of the network and a second network.

Additional methods, aspects, and elements of the present inventive concept are contemplated to be uses in conjunction with, individually or in any combination thereof which will create a reasonably functional communication node, system, and method for dynamically selecting a codec for a communication session. It will be apparent to one of ordinary skill in the art that the manner of making and using the claimed invention has been adequately disclosed in the above-written description of the exemplary embodiments and aspects. It should be understood, however, that the invention is not necessarily limited to the specific embodiments, aspects, arrangement, and components shown and described above, but may be susceptible to numerous variations within the scope of the invention.

Moreover, particular exemplary features described herein in conjunction with specific embodiments or aspects of the present invention are to be construed as applicable to any embodiment described within, enabled through this written specification and claims, or apparent based on this written specification and claims. Thus, the specification and drawings are to be regarded in a broad, illustrative, and enabling sense, rather than a restrictive one. It should be understood that the above description of the embodiments of the present invention is susceptible to various modifications, changes, and adaptations, and the same are intended to be comprehended within the meaning and range of equivalents of the appended claims.

Therefore, we claim:

1. A communication node for dynamically selecting a codec for a communication session transmitted within an at least one network, the communication node comprising:
   at least one communication endpoint;
   a codec database further comprising a catalog of available and supported codecs, wherein the catalog of available and supported codecs is prioritized at the codec database at least in part based on a throughout threshold;
   a first communication node operably connected to the at least one communication endpoint and operably connected to the codec database, the first communication node comprising:
   a communication module capable of:
   accepting an at least one session parameter initiating the communication session, the at least one session parameter comprising a session criteria, a session type, predetermined routing information for routing the communication session, and a first codec; and transmitting the communication session to a second communication node;

a network monitor to observe the at least one network and detect if a network event occurs, whereby, upon a detection of the occurrence of the network event, transfer from a codec database operably connected to the communication node a catalog of available and supported codecs;

a determiner for selecting a second codec from the catalog of available and supported codecs, wherein the determiner selects the second codec based at least in part on a prioritization of the catalog of available and supported codecs, the network event, the session type, the session criteria, and the predetermined routing information for routing the communication session; and a message generator for creating a network message directing the second communication node to replace the first codec with the second codec, wherein replacement comprises a modification of an at least one signaling protocol of the communication session to remove the first codec, integrate the second codec, and indicate the second codec for reception at a destination node.

2. The communication node of claim 1, wherein monitoring the network to detect the occurrence of the network event further comprises receiving and analyzing an at least one in-band message and an at least one out-of-band message associated with the communication session.

3. The communication node of claim 2, wherein the at least one in-band message further comprises an at least one Real-time Transport Protocol (RTP) message.

4. The communication node of claim 2, wherein the at least one out-of-band message further comprises at least one RTP Control Protocol (RTCP) message.

5. The communication node of claim 1, wherein the first codec and the second codec further comprise at least one of a set of codecs which have audio compression formats, text compression formats, and video compression formats.

6. The communication node of claim 1, wherein the destination node is within at least one of the network and a second network.

7. The communication node of claim 1, further comprising a codec modifier for modification of the at least one signaling protocol of the communication session to remove the first codec, integrate the second codec, and indicate the second codec for reception at the destination node, wherein modification of the at least one signaling protocol occurs at the communication node, with no network message needing to be created to notify a second communication node to modify the at least one signaling protocol.

8. The communication node of claim 1, wherein modification of the at least one signaling protocol further comprises a modification at a transport layer.

9. The communication node of claim 1, wherein the catalog of available and supported codecs is prioritized at least in part based on a throughput threshold.

10. The communication node of claim 1, wherein the catalog of available and supported codecs is further prioritized at least in part based on a latency threshold.

11. The communication node of claim 1, wherein the catalog of available and supported codecs is prioritized at least in part based on the throughput threshold or a latency threshold.

12. The communication node of claim 9, wherein the throughput threshold further comprises a set of throughput thresholds based at least in part on a range of session types, a range of session criteria, and an at least one network condition, wherein the codec database determines the throughput threshold from the set of throughput thresholds based on the at least one session parameter communicated to the codec database by the communication node.

13. The communication node of claim 10, wherein the latency threshold further comprises a set of latency thresholds based at least in part on a range of session types, a range of session criteria, and an at least one network condition, wherein the codec database determines the latency threshold from the set of latency thresholds based on the at least one session parameter communicated to the codec database by the communication node.

14. A system for dynamically selecting a codec for a communication session transmitted within a network, the system comprising:

at least one communication endpoint;

a codec database further comprising a catalog of available and supported codecs, wherein the catalog of available and supported codecs is prioritized at the codec database at least in part based on a throughput threshold;

a first communication node operably connected to the at least one communication endpoint and operably connected to the codec database, the first communication node comprising:

a communication module capable of:
accepting an at least one session parameter initiating the communication session, the at least one session parameter comprising a session criteria, a session type, predetermined routing information for routing the communication session, and a first codec; and
transmitting the communication session;

a network monitor to observe the at least one network and detect if a network event occurs, whereby, upon a detection of the occurrence of the network event, transfer from the codec database to the communication node a catalog of available and supported codecs;

a determiner for selecting a second codec from the catalog of available and supported codecs, wherein the determiner selects the second codec based at least in part on a prioritization of the catalog of available and supported codecs, the network event, the session type, the session criteria, and the predetermined routing information for routing the communication session; and a message generator for creating a network message directing a second communication node to replace the first codec with the second codec, wherein replacement comprises a modification of an at least one signaling protocol of the communication session to remove the first codec, integrate the second codec, and indicate the second codec for per QS reception at a destination nodes;

an at least one second communication node operably connected to the first communication node, the at least one second communication node comprising:

a codec modifier to replace the first codec with the second codec based on the network message, whereby replacement comprises a modification of the at least one communication session signaling protocol to withdraw the first codec without altering the communication session, integrate the second codec, and indicate the second codec for reception at a destination node; and a second communication module capable of:
receiving the communication session and the associated network message from the first communication node; and
transmit the communication session to the destination node.

15. The system of claim 14, wherein the second communication node further comprises a second message generator for creating a second network message to notify an at least one third communication node to switch the second codec to the first codec if the destination node only accepts communication sessions utilizing the first codec.

16. The system of claim 14, wherein the system further comprises:
an at least one third communication node, which when it receives the communication session with the modified at least one signaling protocol where the first codec has been replaced with the second codec, the at least one third communication node comprising:
an at least one third codec modifier to replace the second codec with the first codec based on a network message created and transmitted by the at least one second communication node, whereby replacement comprises a modification of at least one communication session signaling protocol to withdraw the second codec without altering the communication session, integrate the first codec, and indicate the first codec for reception at a destination node.

17. The system of claim 14, wherein the catalog of available and supported codecs is further prioritized at least in part based on a latency threshold.

18. The system of claim 14, wherein the catalog of available and supported codecs is prioritized at least in part based on the throughput threshold or a latency threshold.

19. The system of claim 14, wherein the throughput threshold further comprises a set of throughput thresholds based at least in part on a range of session types, a range of session criteria, and an at least one network condition, wherein the codec database determines the throughput threshold from the set of throughput thresholds based on the at least one session parameter communicated to the codec database by the first communication node.

20. The system of claim 17, wherein the latency threshold further comprises a set of latency thresholds based at least in part on a range of session types, a range of session criteria, and an at least one network condition, wherein the codec database determines the latency threshold from the set of latency thresholds based on the at least one session parameter communicated to the codec database by the first communication node.

21. The system of claim 14, wherein monitoring the network to detect the occurrence of the network event further comprises receiving and analyzing an at least one in-band message and an at least one out-of-band message associated with the communication session.

22. The system of claim 19, wherein the at least one in-band message further comprises an at least one Real-time Transport Protocol (RTP) message.

23. The system of claim 19, wherein the at least one out-of-band message further comprises an at least one RTP Control Protocol (RTCP) message.

24. The system of claim 14, wherein the first codec and the second codec further comprise at least one of a set of codecs which have audio compression formats, text compression formats, and video compression formats.

25. The system of claim 14, wherein the destination node is within at least one of the network and a second network.

26. The system of claim 14, wherein modification of the at least one signaling protocol further comprises a modification at a transport layer.

27. The system of claim 14, wherein the network further comprises a dynamically updated traffic profile for initiating and terminating communications from and to the network and to and from a second network.

28. A method for dynamically selecting a codec for a communication session transmitted within a network via a series of network devices, the method comprising:
cataloging of available and supported codecs, in a codec database in at an least one communication endpoint, wherein the catalog of available and supported codecs is prioritized at the codec database at least in part based on a throughout threshold;
connecting a first communication node operably to the at least one communication endpoint and operably connected to the codec database, the method further comprising:
accepting at the at least one first communication node an at least one session parameter initiating the communication session, the at least one session parameter comprising a session criteria, a session type, predetermined routing information for routing the communication session, and a first codec;
monitoring the network at the at least one first communication node to observe the network and detect if a network event occurs, whereby, upon a detection of the occurrence of the network event, transfer from a codec database to the communication node a catalog of available and supported codecs;
determining at the at least one first communication node a second codec from the catalog of available and supported codecs, wherein the determination comprises selecting the second codec based at least in part on a prioritization of the catalog of available and supported codecs, the network event, the session type, the session criteria, and the predetermined routing information for routing the communication session; and
generating at the at least one first communication node a network message directing an at least one second communication node to replace the first codec with the second codec, wherein replacement comprises a modification of at least one signaling protocol of the communication session to remove the first codec, integrate the second codec, and indicate the second codec for reception at a destination node; and
transmitting the communication session and the network message to the at least one second communication node.

29. The method of claim 28, further comprising modifying the communication session at the at least one second communication node to replace the first codec with the second codec based on the network message, whereby replacement comprises a modification of the at least one communication session signaling protocol to withdraw the first codec without altering the communication session, integrate the second codec, and indicate the second codec for reception at the destination node, and whereby the at least one second communication node transmits the communication session the destination node.

30. The method of claim 29, further comprising generating a second network message at the at least one second communication node to notify an at least one third communication node to switch the second codec to the first codec if the destination node only accepts communication sessions utilizing the first codec.

31. The method of claim 28, further comprising modifying the communication session at an at least one third communication node to replace the second codec with the first codec based on a network message created and transmitted by the at least one second communication node, whereby replacement comprises a modification of the at least one communication session signaling protocol to withdraw the second codec without altering the communication session, integrate the first codec, and indicate the first codec for reception at the destination node.

32. The method of claim 28, wherein monitoring the network to detect the occurrence of the network event further comprises receiving and analyzing an at least one in-band message and an at least one out-of-band message associated with the communication session.

33. The method of claim 32, wherein the at least one in-band message further comprises an at least one Real-time Transport Protocol (RTP) message.

34. The method of claim 32, wherein the at least one out-of-band message further comprises an at least one RTP Control Protocol (RTCP) message.

35. The method of claim 28, wherein the first codec and the second codec further comprise at least one of a set of codecs which have audio compression formats, text compression formats, and video compression formats.

36. The method of claim 28, wherein the destination node is within at least one of the network and a second network.

37. The method of claim 28, wherein modification of an at least one signaling protocol further comprises a modification at a transport layer.

\* \* \* \* \*